June 30, 1964     A. M. ANDREWS     3,139,365
METHOD AND APPARATUS FOR BONDING SHEET MATERIAL
Filed Aug. 28, 1961     2 Sheets-Sheet 1

INVENTOR.
ALVADORE M. ANDREWS

BY
BUCKHORN, CHEATHAM & BLORE
ATTORNEYS

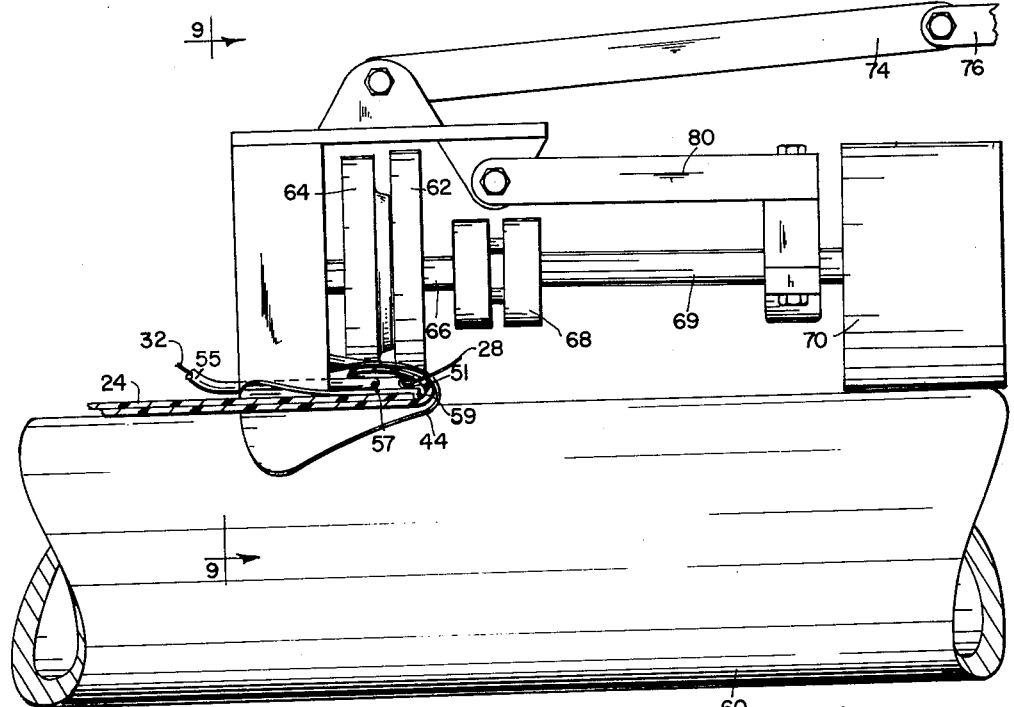
Fig. 8
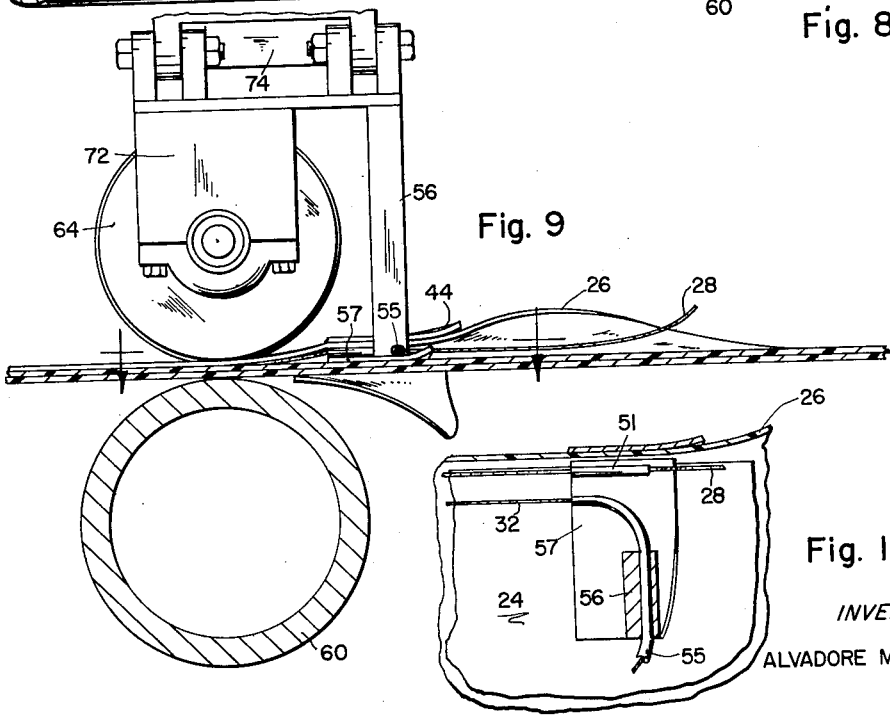
Fig. 9
Fig. 10
INVENTOR.
ALVADORE M. ANDREWS
BY
BUCKHORN, CHEATHAM & BLORE
ATTORNEYS United States Patent Office 3,139,365
Patented June 30, 1964

3,139,365
METHOD AND APPARATUS FOR BONDING
SHEET MATERIAL
Alvadore M. Andrews, 4621 SW. Beaverton-Hillsdale
Highway, Portland, Oreg.
Filed Aug. 28, 1961, Ser. No. 134,364
12 Claims. (Cl. 156—179)

The present invention relates to methods and apparatus for handling sheet material and more particularly to methods and apparatus for joining together the edge portions of continuous sheet material.

It is a specific object of the present invention to provide an improved method and apparatus for forming a tube from a continuous length of flexible sheet material such as synthetic plastic.

Still another object is to provide a method and apparatus for securing together edge portions of superposed layer material without causing the adherence of adjacent portions of such material.

A further object is to provide a method and apparatus for positioning a bond effecting liquid between layers of superposed material to be joined and confining said liquid to the desired area.

Still other objects and advantages of the invention will become more apparent hereinafter.

In accordance with the illustrated embodiment of the present invention two layers of the sheet material to be joined are fed in superposed relation and the edge portion of one layer caused to be overfolded upon the opposite surface of the adjacent layer. As such portion is overfolded, a pair of threads are fed beneath the overfolded edge portion in spaced parallel relation, the thread nearest the free edge of the overfolded portion being impregnated with a bond effecting liquid, the other thread being dry. Thereafter, pressure is applied to the overlapped layers to cause the bond effecting liquid to be expressed from the one thread and to flow between the overlapped edge portion and the adjacent surface of the other layer, the second, dry thread serving to act as a dam to prevent flow of liquid past the same, thereby confining the bond effecting liquid in the desired area.

For a more detailed description of the invention reference is made to the accompanying drawings wherein:

FIG. 8 is a fragmentary elevation of a portion of apparatus made in accordance with the invention;

FIG. 9 is a view taken substantially along line 9—9 of FIG. 8; and

FIG. 10 is a view taken substantially along line 10—10 of FIG. 9.

Figure 1:
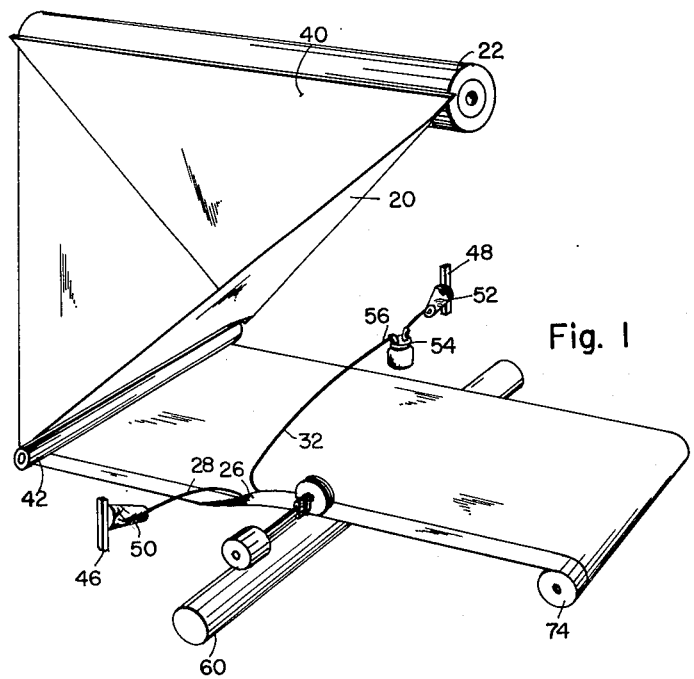
FIG. 1 is a schematic perspective view of an apparatus made in accordance with the invention.
Figure 7:
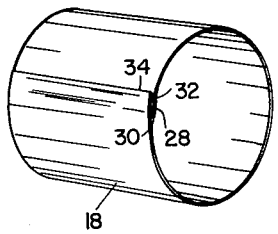
FIG. 7 is a fragmentary perspective view of a tube made in accordance with the invention.
Figure 2:
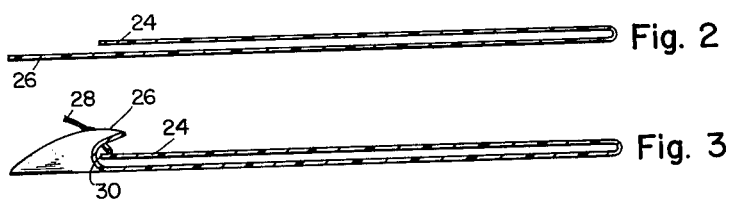
FIG. 2 is a view showing a step in the manufacture of tubing in accordance with the invention from a single sheet of material.
Figure 3:
FIG. 3 is a view showing a further step.
Figure 4:
FIG. 4 is a view of a still further step.
Figure 6:
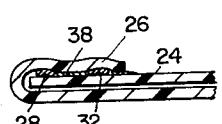
FIG. 6 is an enlarged view of a bond effected in accordance with the invention.
Figure 5:
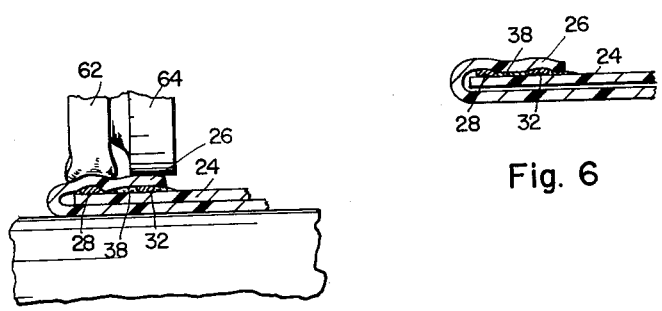
FIG. 5 is a somewhat enlarged view showing a pressing operation to effect expression of the liquid adhesive from a thread and bonding.

With reference first to FIGS. 1 to 7, the invention is illustrated in connection with the manufacture of a tube 18 from a continuous length of flexible sheet material 20 such as vinyl plastic or the like, which may be supplied on a roll 22. In accordance with the illustrated method, the sheet 20 is drawn from the roll 22 and fed along a predetermined path. As it is fed, one edge portion 24 of the sheet is overfolded so that it overlies an intermediate part of the sheet closely adjacent the opposite edge portion 26 of the sheet. The edge portion 26 is then overfolded, as shown in FIG. 3, upon the edge portion 24. At the same time a dry absorptive thread 28 is fed between the overlapping portions 24 and 26 closely adjacent the free edge 30 of the edge portion 24, and a second absorptive thread 32, previously impregnated in any suitable manner with a bond effecting liquid, is also fed between the overlapped portions 24 and 26 in parallel relation to the thread 28 but spaced therefrom in the direction towards the free edge 34 of the second edge portion 26. Finally, pressure is applied to the overlapped edge portions as indicated in FIG. 5, to press the portions together and cause the bond effecting fluid to be expressed from the thread 32 so as to flow laterally therefrom and between the surfaces of the overlapped portions 24, 26, as indicated at 38 in FIGS. 5 and 6. As will be observed, the thread 28, absorbs any liquid flowing into contact therewith, to act as a dam and to prevent such liquid from flowing to a position wherein it might effect a bond between the edge portion 24 and the intermediate portion of the sheet lying therebeneath. Since the usually desired bonding liquid drys extremely rapidly, it is generally not necessary to be concerned about any liquid flowing past the edge 34 onto the upper exposed surface of the sheet inasmuch as the liquid will have evaporated before the tubing is subsequently wound or otherwise handled. However, if desired, dry threads obviously could be positioned on each side of an impregnated thread to confine the lateral liquid flow. Further details of the process will become more apparent in the following description of the apparatus of the invention.

Referring for the moment to FIG. 1, any suitable means may be provided to support the supply roll 22. From the roll 22 the sheet is led over a doubling guide 40 and thence beneath a roll 42 from which the sheet emerges in substantially doubled relation as shown in FIG. 2 with, however, the edge portion 24 positioned slightly inwardly from the opposite edge portion 26. From the roll 42 the sheet is drawn through an edge folding cone 44 (see FIGS. 8 and 9) which cause the edge portion 26 to be overfolded upon the edge portion 24 as indicated in FIGS. 3, 4 and 5.

Means are provided simultaneously with overfolding of the edge portion 26 to feed the threads 28, 32 between the overfolded edge portions. Referring for a moment to FIG. 1, mounted in any suitable manner upon the apparatus as, for example, upon supports 46, 48 are a pair of thread holders or rolls 50, 52. The thread 28 from the roll 50, is led over suitable guides (not shown) and through a guide tube 51 which positions the thread between the edge portions 24, 26 in parallel relation with and closely adjacent to the edge 30. The thread 32 drawn from the supply roll 52 is first passed through a reservoir 54 containing a supply of a bond effecting liquid so as to impregnate the thread 32 with such liquid. Any suitable bond effecting liquid may be used, the choice being dependent upon the material used. Suitable materials are suggested in my prior Patent No. 2,500,053. After impregnation the thread 52 is guided by suitable means so as to be positioned between the overfolded portions 24, 26 in parallel relation to the thread 28 but spaced therefrom in the direction toward the free edge 34 of the edge portion 26 as more particularly illustrated at FIG. 4. Preferably, the thread 32 is led from the reservoir 54 through a tubing 55 which prevents the liquid from evaporating from the thread and which also serves as a guide means to feed the thread into correct position between the overlapped edges 24, 26.

The tubing 55 extends through and is supported by an arm 56 to which the folding cone 44 is secured. The guide tube 51 is suitably secured to the upper surface of a plate 57 also supported by the arm 56. The plate 57 is positioned within the cone 44 (see FIG. 8) and is provided with a downwardly turned flange 59 which is adapted to engage the free edge of the edge portion 24 to guide the same and also to prevent such edge portion from accidentally doubling over upon itself.

Means are provided to press the overfolded edge portions 24, 26 so as to express the bonding liquid from the thread 32 and effect bonding of the edge portions to each other. After the edge portion 26 is overfolded upon the edge portion 24, the sheet 20 is carried over a relatively wide roll 60 and beneath a pair of rolls 62, 64 positioned to overlie the threads 28, 32 respectively. The roll 64 preferably has a relatively hard, non-yielding surface and is arranged to be positioned directly above the thread 32 as shown in FIG. 5. The roll 62, on the other hand, preferably is a resilient roll of larger diameter than the roll 64 and is arranged to be positioned directly over the thread 28. The rolls 62, 64 are mounted coaxially upon, and are driven by a shaft 66. The shaft 66 is secured through a universal joint 68 to a shaft 69 supporting a driving wheel 70 adapted to roll upon the roll 60.

The shaft 66 is supported in a journal 72, supported in turn by links 74, 76 from a suitable base so that the rolls 64, 62 may be elevated as necessary for adjustment or loading of the machine. The shaft 69 is supported in a journal 78, secured to a link 80 pivotally connected to the mount for the journal 72.

The wheel 70 preferably is of a slightly smaller diameter than the roll 64 and has a rubber or other frictional surface thereon so that it will engage and grip the surface 60 with a minimum of slippage. It will be observed that the roll 70 will have the same peripheral speed as the speed of advancement of the sheet 20 whereas the roll 64 being of slightly smaller diameter will have a slightly greater speed, this will tend to cause the roll 64 to place tension upon the edge portion 26 to keep the same taut and to prevent any wrinkles from developing.

The purpose of the larger diameter and resiliency of the roll 62 is two-fold. First, as shown in FIG. 5, it tends to deform laterally and to press the edge portion 26 towards the edge portion 24 on each of the opposite sides of the thread 28 so as to urge the edge portion 26 into contact with the edge portion 24 and effect bonding thereof. Secondly, it tends to flatten in the lengthwise direction and to form a pressure area relatively ahead of the pressure point formed by the pressure of the wheel 64 thus causing the sheet 26 to be pressed into engagement with the sheet 24 in the area adjacent the thread 28 prior to the time that liquid is expressed from the thread 26. In effect, then, a dam is continually being developed forwardly of the expression of the liquid 26 which tends to minimize the likelihood of the bond effecting liquid flowing past the thread 28, which also acts as a dam as previously indicated. After bonding between the edge portions 24, 26 has been effected, the sheet or the flattened tubing thus formed may be rolled upon a wind-up roll 74 or handled in any other suitable manner. Obviously the method and apparatus of the invention are adapted to uniting layers of sheet material in various arrangements and the invention is not limited to the manufacture of tubing.

Having illustrated and described a preferred embodiment of my invention, it will be understood that it is not to be limited to all of the details shown, but is capable of modification and variation within the spirit of the invention and within the scope of the claims.

I claim:

1. The method of joining sheet material together comprising the steps of
   (a) impregnating a first absorptive thread with a bond effecting liquid,
   (b) positioning said thread between the layers of sheet material to be bonded along the area of desired bond,
   (c) positioning a second, dry absorptive thread between said layers along an edge of said area, and
   (d) applying pressure to said layers and the threads therebetween to express said liquid from said first thread so as to flow laterally therefrom, said second thread absorbing any liquid contacting the same to prevent flow of bond effecting liquid therepast.

2. The method of bonding edges of sheet material in overlapping relation comprising the steps of
   (a) feeding such sheet material along a predetermined path with the edge portions to be joined in overlapping relation,
   (b) feeding a first absorptive thread lengthwise between said edge portions,
   (c) impregnating a second absorptive thread with a bond effecting liquid,
   (d) feeding said second thread between said edge portions in parallel relation to said first thread,
   (e) and applying pressure to the outer surfaces of said edge portions so as to press said edge portions together with said threads therebetween, said bond effecting liquid being expelled laterally from said second thread and flowing between said edge portions to effect bonding therebetween, said first thread absorbing any liquid contacting the same to act as a dam and prevent flow of said bond effecting liquid therepast.

3. The method of bonding edges of sheets of material in overlapping relation comprising the steps of
   (a) feeding such sheet material along a predetermined path with the edge portions to be joined in overlapping relation,
   (b) feeding a continuous first absorptive thread lengthwise between said edge portions,
   (c) passing a continuous length of a second absorptive thread through a body of bond effecting liquid,
   (d) feeding said second thread between said edge portions in spaced, parallel relation to said first thread,
   (e) and applying pressure to the outer surfaces of said edge portions so as to press said edge portions together with said threads therebetween, said bond effecting liquid being expelled laterally from said second thread and flowing between said edge portions to effect bonding therebetween, said first thread absorbing any liquid contacting the same to act as a dam and prevent flow of said bond effecting liquid therepast.

4. The method of joining plastic sheeting edge-to-edge in overlapping relation comprising the steps of
   (a) feeding such sheeting along a predetermined path with the edge portions to be joined in overlapping relation,
   (b) feeding a first absorptive thread between said edge portions,
   (c) impregnating a continuous length of a second absorptive thread with a solvent for said plastic,
   (d) feeding said second thread between said edge portions in parallel relation to said first thread,
   (e) and applying pressure to the outer surfaces of said edge portions so as to press the same together with said threads therebetween, said solvent being expelled from said second thread and flowing between said edge portions to effect bonding therebetween, said first thread absorbing any solvent contacting the same to act as a dam and prevent flow of said solvent therepast.

5. The method of forming tubing from a continuous length of flexible plastic sheet material which comprises
   (a) feeding said sheet along a predetermined path,
   (b) overfolding one edge portion of said sheet so that it overlies an intermediate portion of said sheet,
   (c) overfolding the opposite edge portion of said sheet upon said one edge portion so as to overlap the latter, (d) feeding a continuous first absorptive thread lengthwise between said overlapped edge portions, (e) impregnating a second absorptive thread with a bond effecting liquid, (f) feeding said second thread between said overlapped edge portions in parallel relation to said first thread and spaced therefrom in the direction towards the free edge of said opposite edge portion, (g) and applying pressure to the overlying layers of said sheeting to express liquid from said second thread, said liquid flowing laterally, said first thread absorbing any liquid contacting the same thereby acting as a dam to prevent flow of said bond effecting liquid therepast.

6. The method of joining edges of superposed layers of continuous flexible sheet material which comprises (a) feeding said layer along a predetermined path, (b) overfolding one edge portion of one of said layers so as to overlie the opposite surface of the other of said layers along an edge portion of said other layer, (c) feeding a first absorptive thread between said overlapped edge portions, (d) impregnating a second absorptive thread with a bond effecting liquid, (e) feeding said second thread between said overlapped edge portions in parallel relation to said first thread and spaced therefrom in the direction towards the free edge of said one edge portion, (f) and applying pressure to overlying layers of said sheeting to express liquid from said second thread, said liquid flowing laterally, said first thread absorbing any liquid contacting the same thereby acting as a dam to prevent flow of said bond effecting liquid therepast.

7. Apparatus for joining longitudinal edge portions of a pair of superposed layers of sheet material comprising (a) means for moving said material lengthwise along a predetermined path, (b) means for folding a first edge portion of one of said layers of said material into overlapping relation upon a second edge portion of the other of said layers of material, (c) a first thread holder, (d) means for drawing a thread from said holder and feeding the same between said edge portions, (e) a reservoir for holding a supply of bond effecting liquid, (f) a second thread holder, (g) means for impregnating a thread from said second thread holder with said liquid, (h) means for feeding said impregnated thread between said overfolded edge portions in parallel spaced relation to said first thread, and positioning the same between said first thread and the free edge of said first edge portion, (i) and opposed roller means for applying pressure to the overlapped portions of said sheet to cause liquid to be expressed from said second thread.

8. Apparatus for joining longitudinal edge portions of sheet material comprising (a) means for moving said material lengthwise along a predetermined path, (b) means for folding a first edge portion of said material into overlapping relation upon a second edge portion of said material, (c) a first thread holder, (d) means for drawing a thread from said holder and feeding the same between said edge portions, (e) a reservoir for holding a supply of bond effecting liquid, (f) a second thread holder, (g) means for impregnating a thread from said second thread holder with said liquid, (h) means for feeding said impregnated thread between said overfolded edge portions in parallel spaced relation to said first thread, and positioning the same between said first thread and the free edge of said first edge portion, (i) and opposed roller means for applying pressure to the overlapped portions of said material to cause liquid to be expressed from said second thread.

9. Apparatus as set forth in claim 8 wherein said roller means comprises (a) a wide first roll engaging one outer surface of said overlapped portions and extending laterally on each of the opposite sides of said threads, (b) a second non-resilient roll mounted in opposed relation to said first roll over said second thread pressurably to engage said edge portions and said second thread, (c) a third resilient roll of larger diameter than said second roll mounted in coaxial relation to said second roll in opposed relation to said first roll over said first thread whereby said third roll deforms to press said overlapped edge portions together on each of the opposite sides of said first thread.

10. Apparatus for forming a flat plastic sheet into a tube comprising (a) means for overfolding a first edge portion of said sheet upon an intermediate portion of said sheet, (b) means for overfolding the opposite edge portion of said sheet upon said intermediate sheet portion and into overlapping relation with said first edge portion, (c) a first thread holder, (d) means for drawing a thread from said holder and feeding the same between said overfolded edge portions, (e) a second thread holder, (f) means for impregnating a thread from said second thread holder with a bond effecting liquid, (g) means for feeding said impregnated thread between said overfolded edge portions and positioning the same between said first thread and the free edge of opposite portion, (h) and means for applying pressure to the overlapped portions of said sheet to cause liquid to be expressed from said second thread.

11. Apparatus for forming flexible sheet material into a tube comprising (a) means for overfolding a first edge portion of a rectangular sheet of said material upon an intermediate portion of said sheet, (b) means for overfolding the opposite edge portion of said sheet upon said intermediate sheet portion and into overlapping relation with said first edge portion, (c) a first thread holder, (d) means for drawing a thread from said holder and feeding the same between said overfolded edge portions, (e) a second thread holder, (f) means for drawing a thread from said second thread holder and impregnating said thread with a bond effecting liquid, (g) means for feeding said impregnated thread between said overfolded edge portions and positioning the same between said first thread and the free edge of said opposite edge portion, (h) and means for applying pressure to the overlapped portions of said sheet to cause liquid to be expressed from said second thread.

12. Apparatus for forming a flat plastic sheet into a tube comprising (a) means for moving said sheet lengthwise along a predetermined path, (b) means for overfolding a first edge portion of said sheet upon an intermediate portion of said sheet, (c) means for overfolding the opposite edge portion of said sheet upon said intermediate sheet portion and into overlapping relation with said first edge portion,
(d) a first thread holder,
(e) means for drawing a thread from said holder and feeding the same between said overfolded edge portions,
(f) a reservoir for holding a supply of bond effecting liquid,
(g) a second thread holder,
(h) means for passing a thread from said second thread holder through said reservoir so as to impregnate said second thread with said liquid,
(i) means for feeding said impregnated thread between said overfolded edge portions and positioning the same between said first thread and the free edge of opposite edge portion,
(j) and opposed roller means for applying pressure to the overlapped portions of said sheet to cause liquid to be expressed from said second thread.

References Cited in the file of this patent
UNITED STATES PATENTS
2,653,432   Wright _____ Sept. 29, 1953

FOREIGN PATENTS
683,211   France _____ Feb. 5, 1930